(12) United States Patent
Adams

(10) Patent No.: X6043
(45) Date of Patent: Jun. 22, 1830

(54) BRICK MACHINE

(76) Inventor: Nathaniel Adams

United States Patent
Patent No.: X6043
No Printed Specification Available
6043X
N. ADAMS.
BRICK MACHINE.
Patented June 22, 1830.
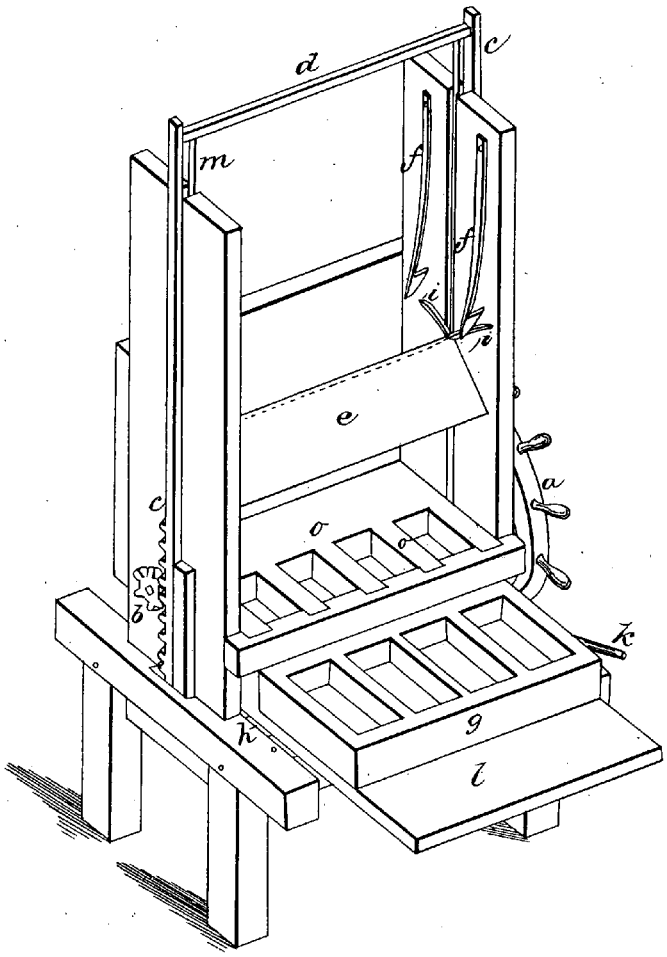
THE MORRIS PETERS CO. PHOTO-LITHO. WASHINGTON D. C.